June 28, 1960     E. M. CHRISTOPHERSON     2,943,184
ILLUMINATED MIRROR FOR SELF-CHECKING OF THE EARS
Filed Aug. 24, 1956
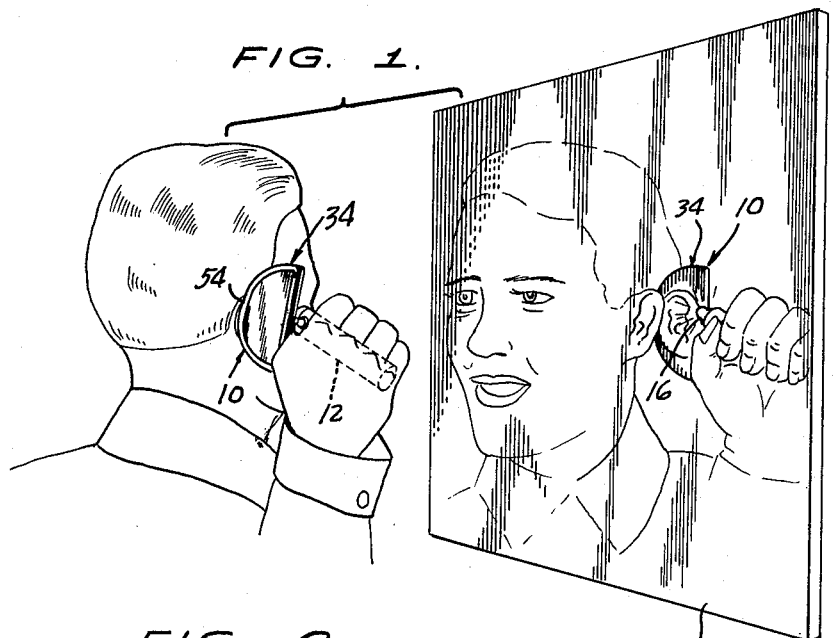
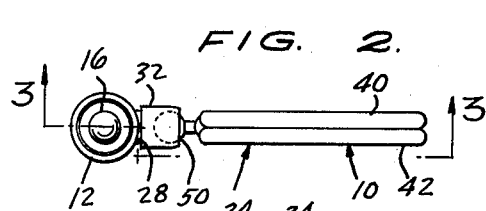
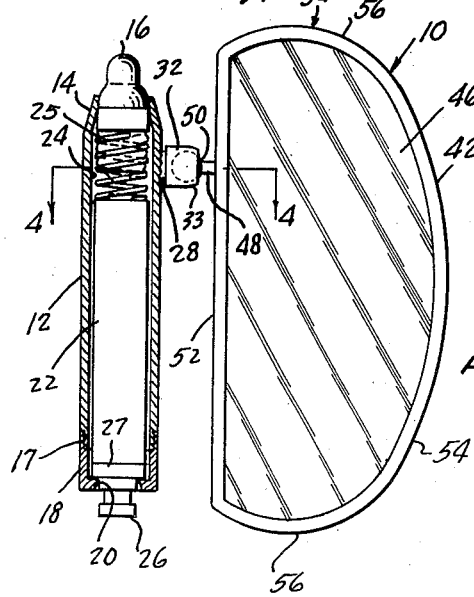
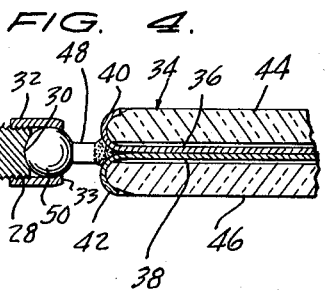
INVENTOR.
EARL M. CHRISTOPHERSON,
BY
McMorrow, Berman + Davidson
ATTORNEYS.

United States Patent Office 2,943,184
Patented June 28, 1960

2,943,184

ILLUMINATED MIRROR FOR SELF-CHECKING OF THE EARS

Earl M. Christopherson, 614 Union, Seattle, Wash.

Filed Aug. 24, 1956, Ser. No. 606,067

1 Claim. (Cl. 240—4.2)

The present invention relates to a device including an illuminating means such as a small flashlight, a universal connection at the side of the flashlight, and a mirror carried by the universal connection, with the construction being such as to permit one holding the flashlight to locate the mirror adjacent his or her ears, for the purpose of looking inside the same with a view to checking the cleanliness of the ears.

It is difficult, if not impossible, for one to check, without the assistance of some other person, the cleanliness of his ears. Even if one were to hold a conventional compact or vanity mirror adjacent his ear, and attempt to view the inside of the ear by observing the reflection cast in said mirror in another, larger mirror, it is very difficult to check the cleanliness of the ears. This is due to the fact that proper illumination does not usually exist, whereby one can observe the interior of the ear in a proper light.

The main object of the present invention is to provide a device which will obviate the difficulties that have hereinbefore existed, and to this end, the device includes an elongated flashlight casing adapted to provide a handle for the user, illuminating means within the flashlight casing comprising a flashlight bulb, battery, and switch; a lateral projection on the casing adjacent the bulb-provided end thereof; a mirror means having reflecting elements on both faces thereof; and means projecting laterally from the mirror means adjacent one end of the mirror means and universally movable within the projection of the casing.

A more specific object of the invention is to form the mirror means in an outer configuration particularly adapted for properly locating the same adjacent the ear and for observing the inside of the ear, with the mirror means at the same time being compactly formed so that it will be easy to manipulate.

Another object is to locate the illuminating means in such a position relative to mirror means and to the handle-defining casing as to insure proper illumination of the inside of the ear, the handle means being naturally positioned and the mirror means being readily adjustable to obtain the desired reflection.

Another object is to so design the flashlight that a switch means incorporated therein will be simply designed, and will be so located that on grasping of the flashlight casing in a natural manner in one hand, one of the fingers of the hand will be disposed for holding the switch depressed.

Yet another object is to so design the connection between the reflecting or mirror means and the handle-defining flashlight as to permit the swift adjustment of the mirror means within a wide range of different positions, about any of various axes, with the mirror or reflecting means being readily engaged in a selected position of adjustment so as to remain in said position during use of the device.

Other objects will appear from the following description, the claim appended thereto, and from the annexed drawing, in which like reference characters designate like parts throughout the several views, and wherein:

Figure 1 is a perspective view showing the device in use;

Figure 2 is an enlarged top plan view of the device per se;

Figure 3 is a sectional view on the same scale as Figure 2, taken substantially on line 3—3 of Figure 2; and Figure 4 is a detail sectional view transversely through the device, on a scale larger than Figures 2 and 3, taken substantially on line 4—4 of Figure 3.

The device 10 constituting the invention includes an elongated, cylindrical flashlight casing 12 one end 14 of which is tapered and formed open to receive a flashlight bulb 16. At its other end, casing 12 is formed open and threaded as at 17, to receive the complementarily threaded cap 18 having in its end wall a center opening 20.

A flashlight battery 22 has an inner end against which abuts one end of a coil spring 24 of electrically conductive material. At its other end, the convolutions of the spring are threaded onto the conventional threads 25 provided upon the electrically conductive side walls of the base of the light bulb 16. The center terminal of the lamp bulb is disposed for engagement by the center post of the battery, with the spring 24 being in contact with the conductive side walls of the battery. Thus, whenever the battery 22 is shifted axially within the casing 12 for engagement of its center post against the centrally disposed base terminal of the lamp bulb, a circuit will be closed including the lamp bulb and battery, to illuminate the bulb.

The battery is normally biased, of course, by spring 24 out of contact with the base terminal of the lamp bulb. However, means is provided for shifting the battery into engagement with the center terminal of the lamp bulb base, and to this end, there is provided a switch button 26 projecting through opening 20 and having within the casing a collar 27 bearing against the base or outer end of battery 22.

It will be apparent, accordingly, that when one grasps the casing 12 in a natural manner as in Figure 1, the little finger of the hand will be disposed for conveniently depressing the button 26 to bias the battery 22 into engagement with the base terminal of the lamp bulb. The lamp bulb is thus illuminated and can be disposed adjacent one's ear for the purpose of casting light into the ear.

Integral or otherwise made rigid with casing 12, adjacent the bulb-receiving end of the casing, is a short, externally threaded, cylindrical, radial projection 28 having in its outer end a segmentally spherically shaped recess 30. Threaded on the projection 28 is a sleeve or ferrule 32, projecting beyond the projection and having a tapering outer end 33.

A reflecting means generally designated 34 includes back-to-back reflecting element support plates 36, 38 formed with inwardly directed peripheral flanges 40, 42 respectively. Gripped by the flanges are deflecting elements 44, 46 providing reflecting surfaces on both faces of the reflecting means 34. Plates 36, 38 are fixedly connected by spot soldering or by any other suitable means, and projecting laterally from the peripheries of the connected plates 36, 38 toward the casing 12 is a short arm 48 fixedly secured to the plates 36, 38 and formed at its outer end with a ball element 50 rotatably engaging in the recess 30 in position enclosed by the sleeve 32. This provides a universal connection of the reflector means 34 to the handle-defining illuminating device constituted by the casing 12 and the components carried by the casing. In any position to which the reflecting means is adjusted, the ferrule 32 may be tightened against the ball element to frictionally bind the ball element against projection 28, thus to preserve the adjustment.

It is seen, thus, that the ball element 50 may be appropriately considered as being disposed in a plane common to the planes of the reflective elements 44, 46, in that the ball element 50 and the reflector means 34 are in a substantially common plane. The reflective means may be adjusted about any of various, selected pivot axes, as for example an axis extending parallel to the length of casing 12, an axis extending transversely through the casing 12 normally to the length thereof, and various other axes which may be found desirable by the user. The pivotal connection between the reflective means and the illuminating device is disposed adjacent the lamp-bulb-provided end of the device, and also adjacent that end of the reflective means that corresponds to said bulb-provided end of the illuminating device.

It is also important to note that the shape of the reflective means roughly approximates the configuration of a human ear, though of course the reflective means is substantially greater in area than the normal ear. In other words, the reflective means has a straight side edge 52, which is the inner side edge in the sense that it is the side edge adjacent the illuminating device. The reflector also has a rounded or arcuately bowed outer side edge 54, merging at its ends into outwardly bowed or rounded end edges 56 of the reflective means.

In use, the device is positioned as shown in Figure 1, with the reflector means in back of and close to the ear and arranged to project laterally from the head, the outer edge 54 being disposed adjacent the head. The plane of the reflector surface may be readily adjusted by movement of the handle defined by the flashlight casing, and further, the reflector means can be readily adjusted by means of the universal connection previously described herein.

In any event, one merely holds the device substantially as shown in Figure 1, and on depression of the switch 26, the interior of the ear will be illuminated, since the handle means in effect points directly toward the ear. With the inside of the ear illuminated, one can observe the reflection of the inside of the ear through another mirror M, thus to check the cleanliness of one's ears without the assistance of another person.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

A device for self-checking of the inside of one's ear comprising an elongated flashlight casing comprising a handle; a battery within said casing; a lamp bulb in one end of the casing; switch means for closing a circuit including the lamp bulb and battery; a mirror spaced laterally outwardly from the casing out of the path of light beams cast by the bulb; and a universal connection between the mirror and casing on which connection the mirror is adjustable to any of a plurality of selected positions in each of which it reflects to the eye of the user, in a path clear of the flashlight casing, the image of the area illuminated by said beams, said universal connection including a lateral projection rigid with the casing and formed with a segmentally spherically shaped recess, an arm projecting laterally from the mirror, a ball element carried by the arm and seating in said recess, and a ferrule receiving the ball and adjustable axially of the projection to bind the ball against the projection in selected positions to which the mirror is adjusted relative to the casing, said ferrule, for a major part of its length, being of constant inner diameter, the ferrule for the remainder of its length being progressively reduced in internal diameter to form thereon an inwardly directed lip, said lip being, at the point at which it is of its smallest diameter, of a diameter less than the diameter of the ball, the inner diameter of the first named portion of the ferrule being approximately equal to that of the ball, and being threaded for part of its length with the projection being complementarily threaded to provide for said axial adjustment of the ferrule, for rotatable movement of the ball within said recess and ferrule on adjustment of the ferrule axially of the projection in a direction to shift said lip from the recess to a selected extent, said ball being frictionally bound within the recess responsive to adjustment of the ferrule in an opposite direction effective to reduce the distance between the recess and lip.

References Cited in the file of this patent

UNITED STATES PATENTS

| | | |
|---|---|---|
| 1,286,287 | Glenn | Dec. 3, 1918 |
| 1,986,086 | Weiss | Jan. 1, 1935 |
| 2,130,388 | Gluck | Sept. 20, 1938 |
| 2,137,881 | Margulies | Nov. 22, 1938 |
| 2,171,304 | Gelardin | Aug. 29, 1939 |
| 2,176,620 | Beam | Oct. 17, 1939 |
| 2,200,114 | Konikoff | May 7, 1940 |
| 2,222,879 | Porter | Nov. 26, 1940 |
| 2,255,312 | Dawson | Sept. 9, 1941 |
| 2,625,942 | Weiss | Jan. 20, 1953 |
| 2,725,788 | Pfleger | Dec. 6, 1955 |